US012794352B2

(12) United States Patent
Degen et al.

(10) Patent No.: US 12,794,352 B2
(45) Date of Patent: Nov. 10, 2026

(54) OVER-VOLTAGE PROTECTION FOR VARIABLE OUTPUT VOLTAGE SMPS

(71) Applicant: NXP USA, Inc., Austin, TX (US)

(72) Inventors: Peter Theodorus Johannes Degen, Arnhem (NL); Wilhelmus Hinderikus Maria Langeslag, Wijchen (NL); Kimmo Petteri Salo, Elst (NL)

(73) Assignee: NXP USA, Inc., Austin, TX (US)

( * ) Notice: Subject to any disclaimer, the term of this patent is extended or adjusted under 35 U.S.C. 154(b) by 185 days.

(21) Appl. No.: 18/810,975

(22) Filed: Aug. 21, 2024

(65) Prior Publication Data

US 2025/0070648 A1 Feb. 27, 2025

(30) Foreign Application Priority Data

Aug. 22, 2023 (EP) .................................... 23192767

(51) Int. Cl.

*H02H 7/00* (2006.01)
*H02H 9/00* (2006.01)
*H02M 1/00* (2006.01)
*H02M 1/32* (2007.01)

(52) U.S. Cl.

CPC ........... *H02M 1/32* (2013.01); *H02M 1/0012* (2021.05); *H02M 1/0025* (2021.05); *H02M 1/0029* (2021.05)

(58) Field of Classification Search

CPC ..... H02M 1/32; H02M 1/0012; H02M 1/0029
USPC ............................................................ 361/18
See application file for complete search history.

(56) References Cited

U.S. PATENT DOCUMENTS 5,862,044 A * 1/1999 Shioya .............. H02M 3/33523 363/56.11
8,729,951 B1 5/2014 Choy et al.
8,884,465 B2 11/2014 Sarhan (Continued)

FOREIGN PATENT DOCUMENTS

CN 112952766 A 6/2021
JP 2016220462 A 12/2016

OTHER PUBLICATIONS

USB PD R3.1 V1.7_0; https://www.usb.org/document-library/usb-power-delivery.

(Continued)

*Primary Examiner* — Crystal L Hammond
*Assistant Examiner* — Lucy M Thomas

(57) ABSTRACT

A method of detecting an over-voltage of an output of a variable output SMPS during a transition from a first target output voltage to a, higher, second target output voltage, and corresponding apparatus and controller, are disclosed comprising determining a signal representative of an output voltage, wherein the output voltage is an output voltage of the SMPS; determining a time-varying signal representative of a maximum allowed output voltage; comparing the signal representative of the output voltage with an instantaneous value of the signal representative of a maximum allowed output voltage; and in response to the signal representative of the output voltage being greater than an instantaneous value of the signal representative of a maximum allowed output voltage, indicating an over-voltage. A corresponding SMPS including such method controller or apparatus is also disclosed.

18 Claims, 10 Drawing Sheets

(56) References Cited

U.S. PATENT DOCUMENTS

| | | | | |
|---|---|---|---|---|
| 2012/0026153 | A1* | 2/2012 | Katagiri | G09G 3/18<br>345/212 |
| 2015/0325305 | A1* | 11/2015 | Saez | H10D 84/85<br>365/185.21 |
| 2016/0077165 | A1* | 3/2016 | Wang | G01R 31/42<br>324/76.77 |
| 2017/0346620 | A1* | 11/2017 | Bucci | H04L 7/044 |
| 2018/0048166 | A1 | 2/2018 | Hsu et al. | |
| 2020/0228018 | A1* | 7/2020 | Wiktor | H02M 3/156 |
| 2023/0042664 | A1 | 2/2023 | Medina-Garcia | |

OTHER PUBLICATIONS

Universal Serial Bus Power Delivery Specification; Revision 3.2, Version 1.0; Oct. 2023; 1,113 pages (this later version (R 3.2) is not prior art, but is only provided since the earlier version USB PD R3.1 V1.7 0 (available to Applicant only via a web-link) appears not to be available anymore).

Universal Serial Bus Power Delivery Specification; Revision 3.1, Version 1.2RC2; Oct. 2021; 747 pages.

* cited by examiner

OVER-VOLTAGE PROTECTION FOR VARIABLE OUTPUT VOLTAGE SMPS

CROSS-REFERENCE TO RELATED APPLICATIONS

This application claims the priority under 35 U.S.C. § 119 of European Patent application no. 23192767.4, filed on 22 Aug. 2023, the contents of which are incorporated by reference herein.

FIELD

The present disclosure relates to over-voltage protection for variable output voltage switch mode power supplies (SMPS). In particular, but not exclusively, it relates to providing over-voltage protection during transitions from a first target output voltage to a second, higher, target output voltage

BACKGROUND

Switch mode power supplies (SMPS) are widely used to convert a high voltage such as a mains voltage to a lower voltage for specific applications. Typical example applications include voltage adapters for computers, laptops, tablets, phones and the like. Since the applications have different power requirements, and typically operate at different voltage levels, conventional SMPS are specific to one application or one type of application.

SMPS have been developed which are compatible with different applications, however the interface to the application (tablet, mobile phone, etc.) is still generally specific to that type of application. More recently, universal interfaces have been proposed and developed which is compatible with applications having different supply voltage supply power requirements. One such universal interface is the "universal serial bus" (USB), for which an international standard has been established. A recent development of the USB standard is to enable and standardise power delivery at a voltage which may be determined, that is to say requested or set, by the application rather than the power supply. This has been achieved under the USB-PD version of the standard. The USB-PD standard has been extended to address power-levels greater than 240 W, as an extended power range (EPR) part of the standard.

An important aspect of power supply and power delivery is that of protection against over-voltage. The introduction of a supply voltage which is set by the application brings with it challenges as regards the implementation of over-voltage protection (OVP), in particular, since the threshold or trigger voltages for OVP should relate to the voltage requested (in normal operation, absent a failure mode) by the application.

SUMMARY

According to a first aspect of the present in disclosure there is provided a method of detecting an over-voltage on an output of a variable output voltage SMPS, the method comprising: determining a signal representative of an output voltage, wherein the output voltage is an output voltage of the SMPS; determining a time-varying signal representative of a maximum allowed output voltage; comparing the signal representative of the output voltage with an instantaneous value of the signal representative of a maximum allowed output voltage; and in response to the signal representative of the output voltage being greater than an instantaneous value of the signal representative of a maximum allowed output voltage, indicating an over-voltage. By using a time-varying signal representative of a maximum allowed output voltage, during a transition from a first, lower, voltage to a second, higher, voltage, methods according to the present disclosure may set the trigger or threshold voltage for an over-voltage event to change over time, thereby avoiding an instantaneous change in the trigger or threshold voltage to that used for the higher target voltage in steady state. The headroom between the maximum expected voltage at any instance and the trigger threshold voltage for an over-voltage event at that instant may be controlled, for example to obtain a constant or near-constant headroom between the expected instantaneous voltage during the transition and the threshold. Exposure of a load to excess voltages may thereby be reduced or eliminated. The threshold or trigger voltage is an indication of an overvoltage event and may trigger a response (such as shutting down the SMPS).

In one or more embodiments, the method is implemented, during a transition from a first target output voltage to a, higher, second target output voltage. Conventional single-step switching from a first, lower voltage, OVP trigger or threshold, to a second, higher voltage OVP trigger or threshold, is particular prone to fault, since during the transition of the output voltage, the headroom between an expected voltage, and the trigger level may greatly exceed that during normal, that is to say steady-state voltage, operation.

In one or more embodiments, the signal representative of an output voltage is a digital signal. Processing in the digital domain may be more convenient than in an analog domain.

In one or more embodiments, the instantaneous value of the signal representative of a maximum allowed output voltage is determined from the first target output voltage by adding a time-integral of a maximum slew rate to a first target voltage and adding an offset voltage. The time varying signal representative of the maximum allowed output voltage may thus be calculated, for example as a linearly increasing value during the transition.

In one or more embodiments, the instantaneous value of the signal representative of a maximum allowed output voltage is predetermined and stored in a look-up table. Each instantaneous value may be predetermined through a prior calculation and stored in memory such as a lookup table. Predetermining the instantaneous values may reduce the processing required during operation and thereby reduce the power consumption or efficiency of the controller.

In one or more other embodiments, the time-varying signal representative of a maximum allowed output voltage is determined from the signal representative of an output voltage. Determining the time varying signal from the signal representative of the output voltage itself may be particularly convenient as it may require a relatively small amount of memory.

In one or more such embodiments, the time-varying signal representative of a maximum allowed output voltage is determined from the signal representative of an output voltage by applying a slew-rate-limiting filter to the signal representative of an output voltage, and adding a voltage offset. Use of a slew-rate-limiting filter may be a convenient way of determining a maximum expected value of the voltage and adding a voltage offset may assist in avoiding spurious or unintentional overvoltage events. Without limitation, the offset may be an absolute offset—that is to say a fixed value, or a relative offset—that is to say a fixed percentage, or a combination of the two.

According to a second aspect of the present disclosure, there is provided an over-voltage protection, OVP, apparatus for a variable-output voltage switch mode power supply, SMPS, the OVP apparatus comprising a voltage sensor for sensing a signal representative of an instantaneous output voltage of the SMPS; a calculation unit configured to determine a maximum allowed instantaneous output voltage; and a comparator configured to compare the signal representative of the instantaneous output voltage with the maximum allowed instantaneous output voltage, and to provide an over-voltage indicator in response to the instantaneous output voltage exceeding the maximum allowed instantaneous output voltage.

In one or more embodiments, the OVP apparatus further comprises a look-up table configured to store the maximum allowed instantaneous output voltage.

In one or more embodiments, the OVP apparatus further comprises the calculation unit is configured to determine the maximum allowed instantaneous output voltage from the first target voltage by adding an offset voltage to a maximum instantaneous expected voltage.

In one or more such embodiments, the OVP apparatus further comprises a slew-rate-limiting filter configured to determine the maximum instantaneous expected voltage from an integral of the signal representative of the instantaneous output voltage.

According to a third aspect of the present disclosure there is provided a controller for an SMPS, comprising the OVP apparatus as described above According to a fourth aspect of the present disclosure, there is provided an SMPS, comprising a controller as described above and a transformer having an auxiliary winding on a primary side, wherein the signal representative of the instantaneous output voltage is a scaled version of a voltage across the auxiliary winding. The signal representative of the instantaneous output voltage may be derived from the voltage across the auxiliary winding by means of, for instance, a voltage divider. Moreover, the voltage across the auxiliary winding will itself be a scaled version of the output voltage.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as nonlimiting examples. The software implementation may be an assembly program.

The computer program may be provided on a computer readable medium, which may be a physical computer readable medium, such as a disc or a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
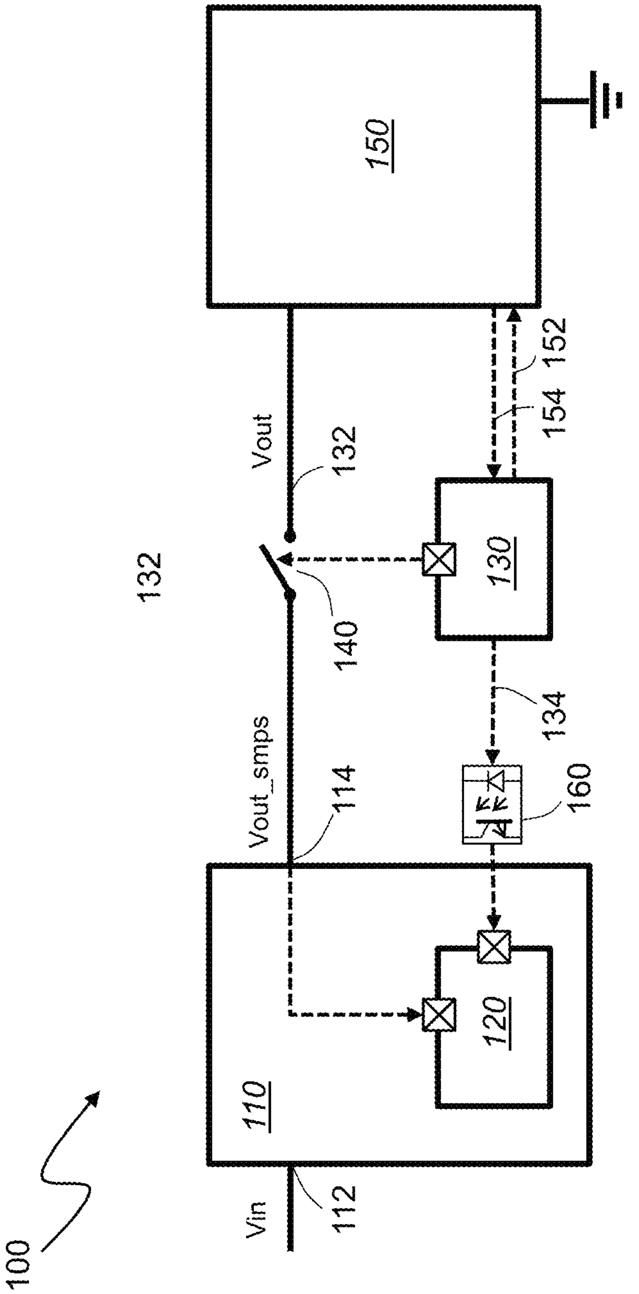
FIG. 1 shows, schematically, part of a system using USB-PD.

It should be noted that the FIGURES are diagrammatic and not drawn to scale. Relative dimensions and proportions of parts of these FIGURES have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 shows, schematically, part of a USB-PD system 100, which is included among the fields of application of the present disclosure. The system 100 includes a switch mode power supply, SMPS 110, which has associated with it a controller 120. Controller 120 may be embodied in an integrated circuit (IC), and may be an integral part, as shown of the SMPS 110 or may be external to it. SMPS 110 has an input 112 at an input voltage 112. It outputs an output voltage Vout_smps at output 114. The system further includes a USB-PD controller 130. Controller 130 may be embodied in an integrated circuit. The integrated circuit for USB-PD controller 130 may be part of the same IC which embodies SMPS controller 120, or may be a separate IC. USB-PD controller 130 may control a switch 140 and/or other circuitry, and provide an output 132 Vout, which is supplied to a load 150. Load 150 communicates with the USB-PD controller 130, as illustrated by control signals 152 and 154. The communication may include an indication of the required voltage for the load 150. USP-PD controller 130 communicates with SMPS controller 120, as illustrated by signal 134. Typically, the SMPS controller 120 is arranged on the primary, or high voltage, side of the SMPS. The system may therefore include an optocoupler 160, or other means of galvanically isolating the USB-PD IC 130 from SMPS controller 120.

Figure 2:
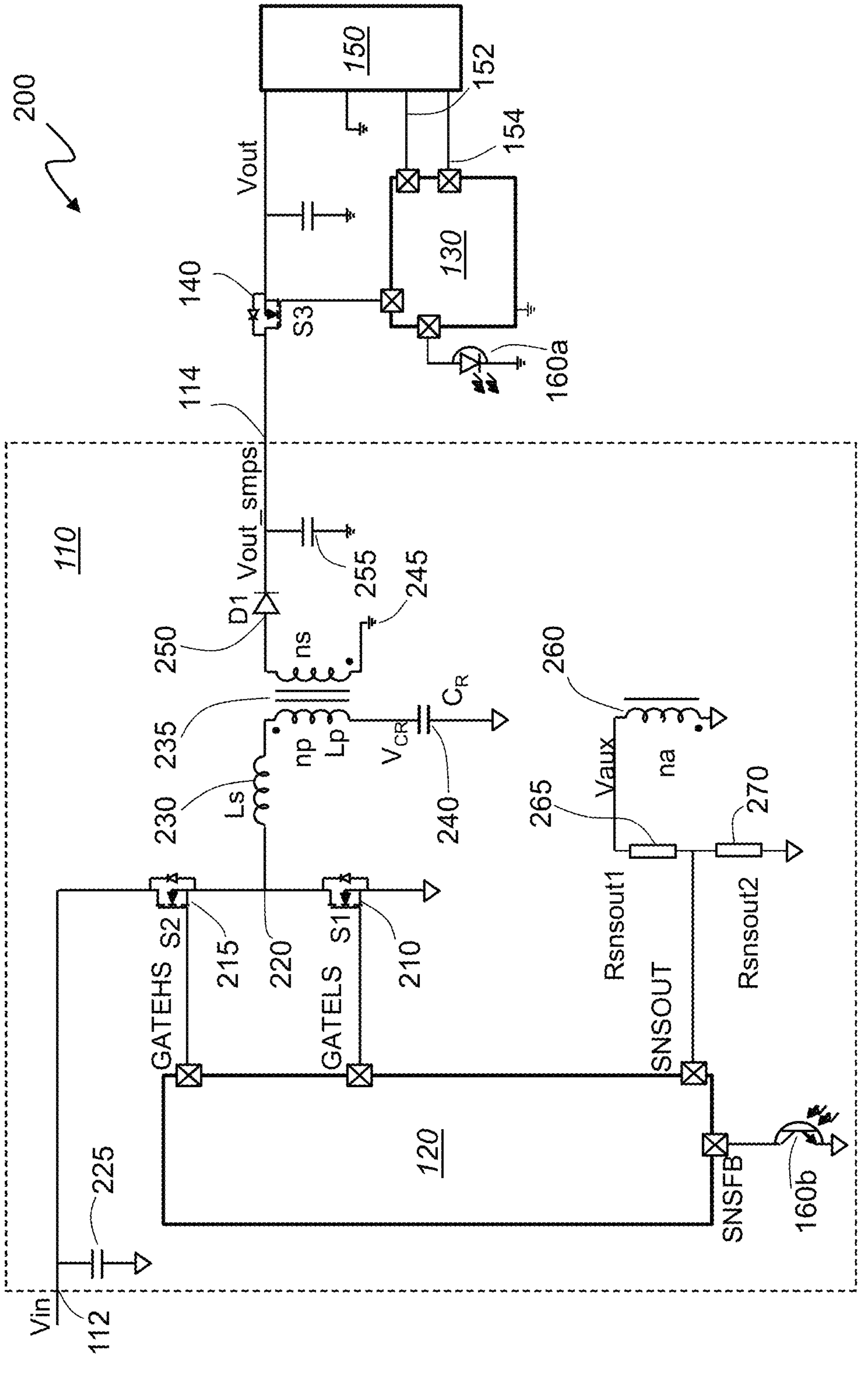
FIG. 2 shows a system which corresponds to that of FIG. 1 in more detail.

FIG. 2 shows a system 200, which corresponds to that of FIG. 1, in more detail. In particular, the FIG. shows detail of the SMPS. As shown the SMPS may be a half-bridge converter, comprising low-side switch S1 210 and high-side switch S2 215. The gates of low-side switch S1 210 and high-side switch S2 215 are connected to pins GATELS and GATEHS of the SMPS controller 120 respectively.

Low-side switch S1 210 is connected to a primary side ground, and high-side switch S2 215 is connected to the input voltage Vin 112. The input voltage Vin 112 may be connected to primary side ground through a capacitor 225. The half bridge node 220 between low-side switch 210 and high-side switch 215 is connected, optionally by a series inductance Ls 230 as shown, to a primary side winding Lp of a transformer 235. The primary side winding Lp is connected to a primary side ground through a resonance capacitor CR 240. Together with series inductance Ls 230, resonance capacitor 240 provides a resonance behaviour. One end of a secondary side winding is connected to a secondary ground 245, and the other is connected, via a diode 250, to the output Vout_smps 114 of the SMPS. A capacitor 255 may be included connecting the output Vout_smps 114 to the secondary ground. Switch 140 may be implemented as a transistor, typically a MOSFET, S3. The optocoupler 160 is illustrated by the LED 160*a* on the secondary side and photodiode 160*b* on the primary side. The photodiode 160*b* is connected to a feedback sense pin SNSFB of the SMPS controller 120.

A signal representative of the output voltage, Vout_smps, at the output 114 of the SMPS is connected to a pin SNSOUT of the SMPS controller 120. To provide the signal, the transformer is provided with an auxiliary winding 260 on the primary side of the transformer. The voltage Vaux across the auxiliary winding is related to the output voltage through the turns ratio between the secondary winding and the auxiliary winding. The voltage Vaux may be scaled by means of a voltage divider comprising two resistors Rsnsout1 265 and Rsnsout2 270. If the secondary side winding of transformer 235 has ns turns and the auxiliary winding 260 has no turns, the voltage at pin SNSOUT is representative of the output voltage of the SMPS through:

$$V_{SNSOUT} = \frac{Rsnsout1}{Rsnsout1 + Rsnsout2} \cdot \frac{na}{\mathrm{ns}} \cdot \mathrm{Vout\_smps}$$

Figure 3:
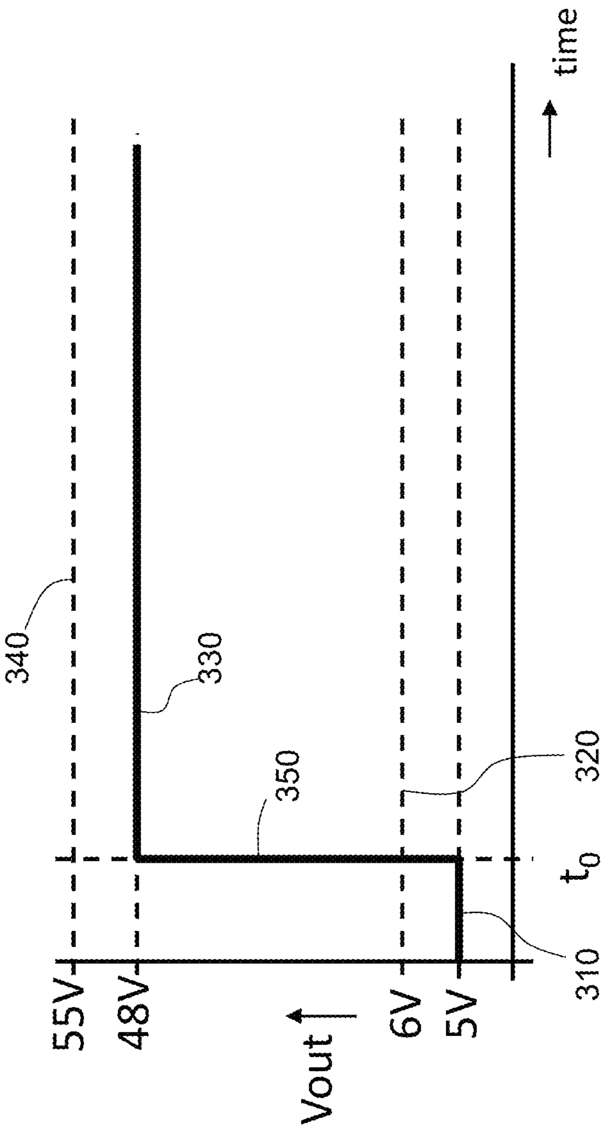
FIG. 3 illustrates target voltages and trigger voltages for OVP for a variable output voltage SMPS.

Turning now to FIG. 3, this illustrates target voltages and trigger voltages for OVP for a variable output voltage SMPS. As shown at 310. the SMPS may have a first target output voltage of, for instance, 5V. A corresponding trigger or threshold voltage for OVP may be, as shown at 320, 6V. Also shown, at 330, is a second target output voltage which in this case is 48V, and a corresponding trigger or threshold voltage for OVP corresponding to the target voltage which may be, as shown at 340, 55V. In the case of a multi-output voltage SMPS, the target output voltage may be initially set to the first voltage—5V in this case. However, if the application requires a target voltage of 48V, it may communicate with the SMPS (using for example the USB-PD protocol) and the target output voltage of the SMPS may be switched to 48V. This is illustrated in FIG. 3 at to 350. As shown in FIG. 3, the output voltage Vout increases from 5V to 48V. However, in practice the change cannot be instantaneous as shown, but rather takes a finite time. This is illustrated in FIG. 4.

Figure 4:
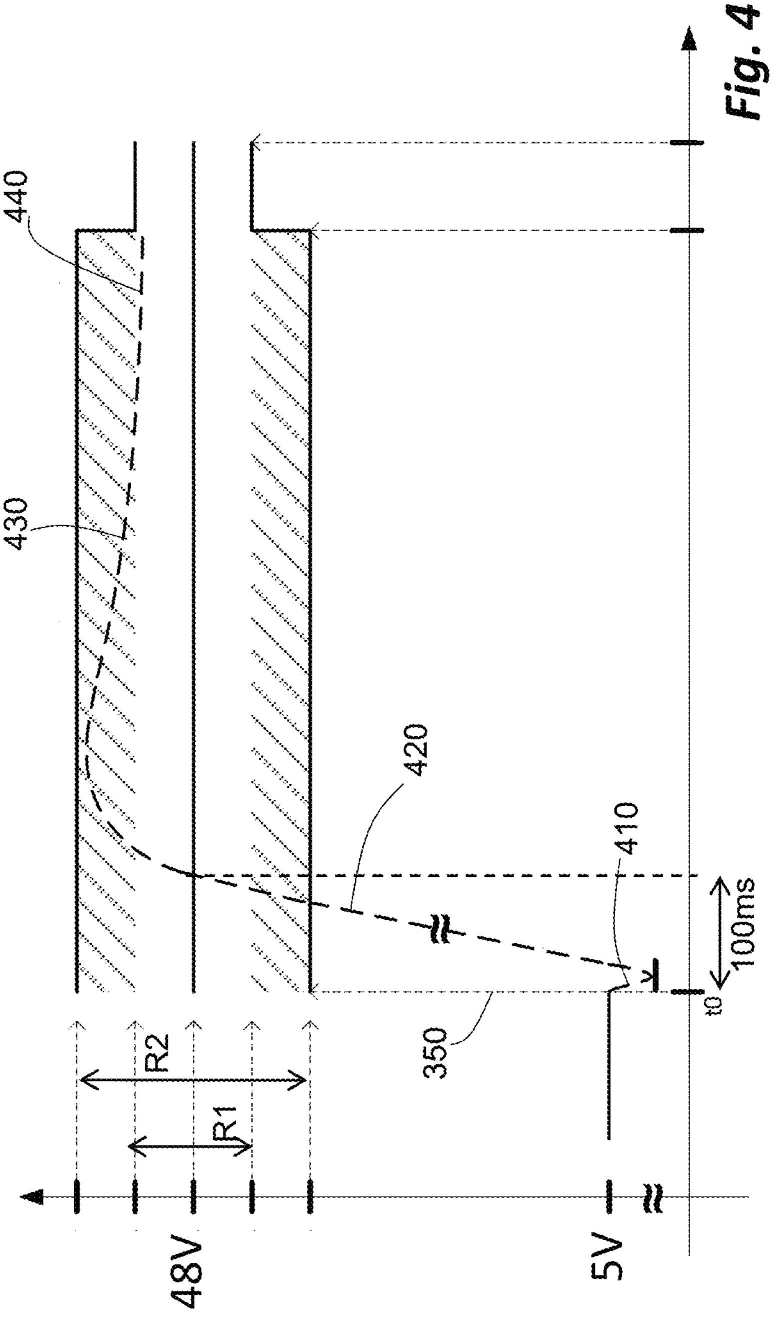
FIG. 4 shows, schematically, the actual output voltage of an SMPS during a transition from a target output voltage to a higher target output.

FIG. 4 shows, schematically, the actual output voltage of an SMPS during a transition from a first, lower, target output voltage of, in this instance, 5V to a second, higher, target output voltage of, in this instance, 48V. The target voltage is changed at moment t0 350. (In some situations, the load could also increase, corresponding to an increase in the current drawn from the output, and so initially the voltage might fall as shown at 410. However, this is not necessarily the case.) Thereafter, the power available from the SMPS increases, resulting in a rise in the output voltage, with a finite slew rate, shown at 420. As a result of the finite slew rate, it takes a finite amount of time to reach the target voltage, which may be of the order of 100 ms, or up to 285 ms for a rise to 20V or 700 ms for a rise to 48 according to the different parts of the USB-PD standard. As shown at 430, there may even be an overshoot beyond the target voltage, in this case 48V before the output settles at, or within a predefined range R1 of, the target voltage, as shown at 440. During the transition, the standard may provide for an extended range, as illustrated in FIG. 4 by R2

The inventors of the present disclosure have appreciated that, since the expected change of voltage from the first target value to the second target value occurs not instantaneously, but over a finite time with a maximum limit to the slew rate, it may be useful to similarly change the trigger threshold voltage for an OVP event over a finite time rather than instantaneously. This principle is illustrated in FIG. 5.

Figure 5A:
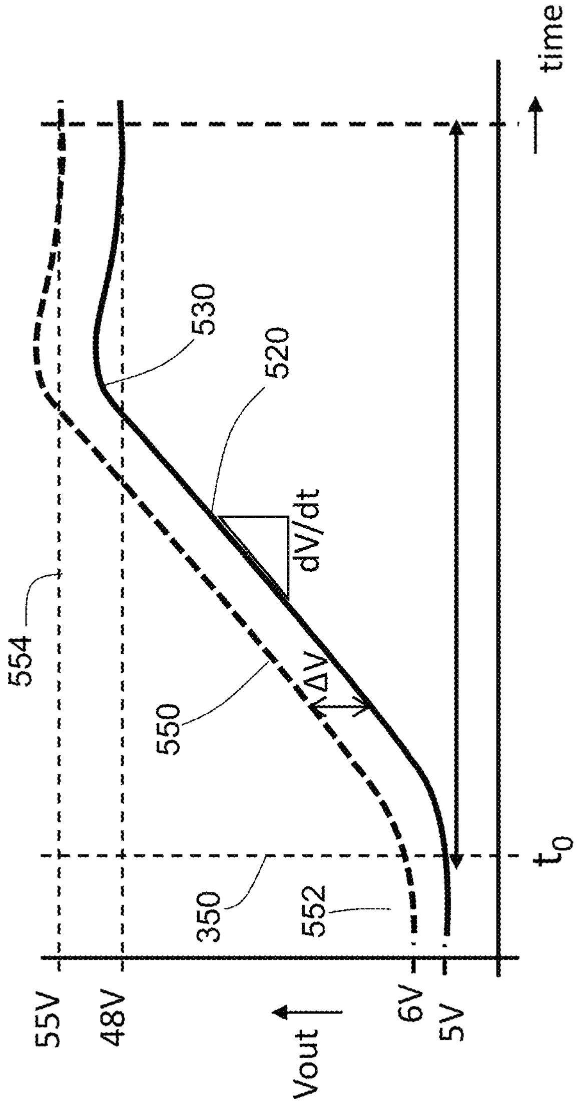
FIG. 5*a* shows, schematically, a time-variable threshold trigger voltage for OVP event, during a transition from a first target voltage to a second, higher target voltage, according to one or more embodiments.

FIG. 5*a* shows, schematically, a time-variable threshold trigger voltage for OVP event, during a transition from a first target voltage to a second, higher target voltage. FIG. 5*a* shows, at 520, the transition of an actual output voltage of the out from a first target value which in this instance is 5V to a second target value which in this instance is 48 V. The transition takes a finite time, primarily because the increase in voltage 520 occurs with a finite slew rate dV/dt. There may be an overshoot period 530 as shown. The skilled person will appreciate that the actual slew rate dV/dt will depend on the design of the overall system, and particularly of the secondary USB-PD controller where that is present, and the component values thereof. However, in general the voltage transition will not be instantaneous. And for any particular design of system, there is a maximum slew rate that may be expected. So the curve 520 shown in FIG. 5*a* may also correspond to a maximum expected rate of change of voltage.

A time variable threshold trigger voltage for an OVP event may then be defined, as shown, to be one which is, at all times, higher than the maximum expected voltage 520, but is time-variable in the sense that it does not transition immediately from its initial value 552 to its final value 554. It may equivalently be described as a non-instantaneous transition, or a gradual transition. In the example shown, the initial value is at 6V and the final value is at 55V, which are both around 20% above the regulation level. The threshold trigger voltage 550 is a level ΔV above the maximum expected output voltage. Delta V may be a fixed value, or may be a slowly changing value which changes from the difference between the OVP threshold or trigger for the first, lower target voltage (in this case 1V which is the difference when 6V and 5V) to the difference between the OVP threshold trigger for the second, higher target voltage (in the instance shown 7V which is the difference between 55V and 48V). Typically, the OPV trigger or threshold is about 20% higher than the expected or measured output voltage, or could be fixed at an absolute value, of could be combination of the two.

Figure 5B:
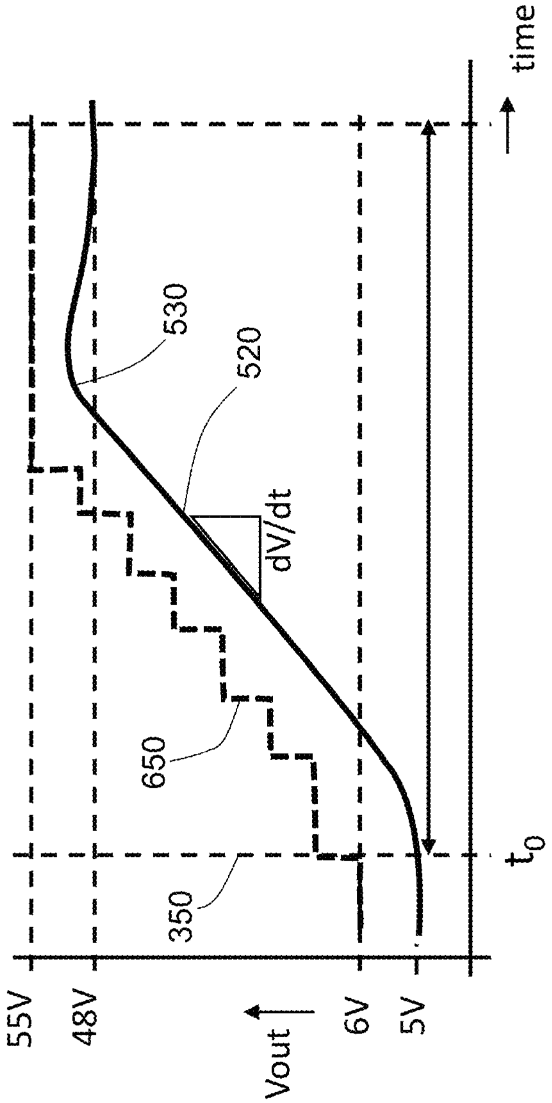
FIG. 5*b*, shows, schematically, a time-variable threshold trigger voltage for OVP event, during a transition from a first target voltage to a second, higher target voltage according to one or more other embodiments.

Turning to FIG. 5*b*, this shows, schematically, a time-variable threshold trigger voltage for OVP event, during a transition from a first target voltage to a second, higher target voltage according to one or more other embodiments of the present disclosure. In this example, the OVP trigger off threshold voltage is changed from the initial value of 6V, which is the OVP trigger or threshold for the lower target output voltage to the final value of 55V (which is the OVP trigger threshold for the higher target output voltage) in a series of steps, rather than as a smoothly varying function such as that shown in FIG. 5*a*. Providing the trigger or threshold voltage as a series of steps may be particularly convenient for embodiments in which the value at any instance of time is stored in a memory as a series of values. As an example, if the maximum expected slew rate of the output voltage results in a transition period of 100 ms, the OVP trigger or threshold may be increased in a series of 100 steps—that is to say once every 1 ms.

Figure 6A:
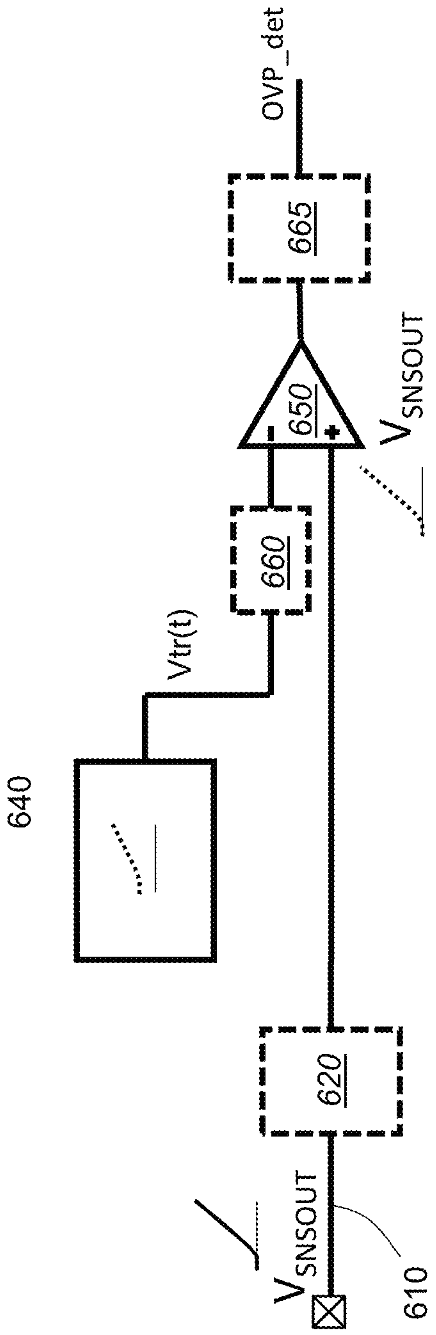
FIG. 6*a* shows, schematically an embodiment in which the voltage $V_{SNSOUT}$ is representative of the output voltage.

The instantaneous OVP trigger or threshold value may be stored in memory such as a lookup table, which may be convenient for embodiments such as that shown in FIG. 5*b*. FIG. 6*a* shows, schematically, such an embodiment, in which the voltage $V_{SNSOUT}$ is representative of the output voltage. According to embodiments such as that shown in FIG. 6*a*, the voltage on pin SNSOUT 610 of the SMPS control IC is processed in the digital domain, and so the signal is digitised by means of an analog-to-digital converter 620. This signal, which is representative of an output voltage of the SMPS and varies over time, is compared with a time-varying signal representative of a maximum allowed output voltage, Vtr(t). In embodiments such as that shown in FIG. 6*a*, the time-varying signal representative of a maximum allowed output voltage is pre-determined. It may, for instance be stored in memory such as 640 shown, as a series of values at specific times after a transition starts. In other embodiments, it may be calculated during operation, as a series of values which increase as a function of time starting from an initial overvoltage trigger or threshold value. One nonlimiting type of function is a linearly increasing function which increases over time at a preset rate, which may typically correspond to a maximum predicted slew rate for a specific SMPS design. The value of the maximum allowed output voltage at time $t_i$, $Vtr(t_i)$, is compared with the digital instantaneous signal representative of the output voltage $V_{SNSOUT}$, at that time $t_i$. This is shown in FIG. 6*a* at comparator 650. If the digitised version of the signal $V_{SNSOUT}$ is greater than Vtr(t), it is likely that an OVP event has occurred. The skilled person will appreciate that there may be noise in the system, so optionally a further filtering is applied (for instance a low pass filter to filter out a single aberration in the digitisation) as shown at 665, and—also optionally—before the comparator as shown at 660. The result of the (optionally filtered) comparator is an OVP detection signal (OVP_det).

In other embodiments, the instantaneous OVP trigger or threshold value may be calculated, instead of retrieved from memory. For example, in the case of a maximum expected slew rate M, and an initial target voltage of V0, the instantaneous OVP trigger or threshold value Vtr at a time t after the start of the transition may be calculated according to:

$$1.\ Vtr(t) = (V0 + Voffset) + M \cdot t$$

Figure 6B:
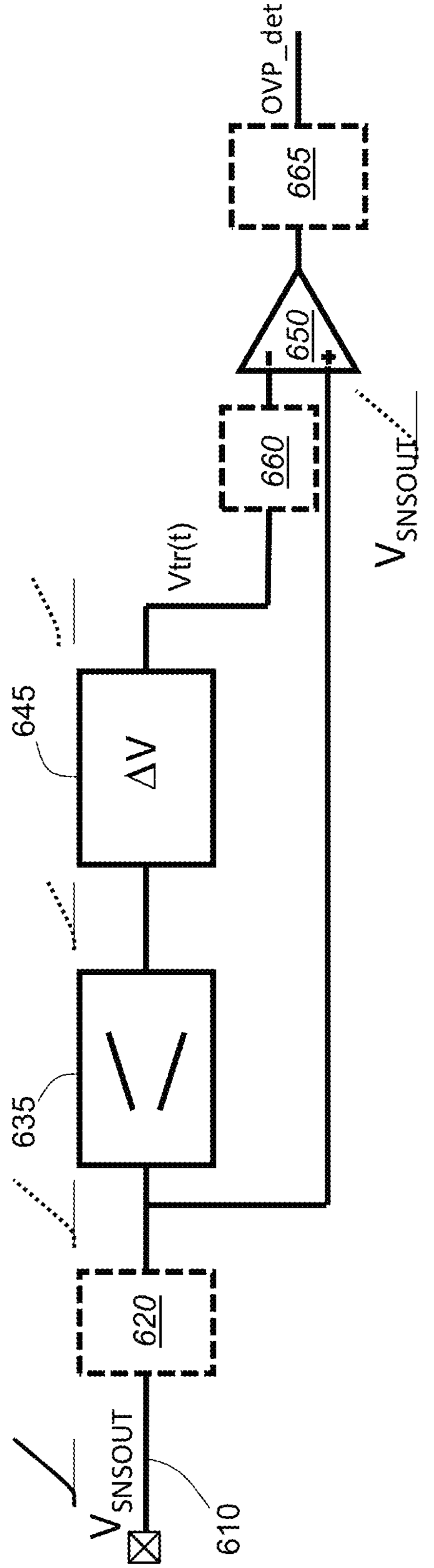
FIG. 6*b* shows an embodiment in which the instantaneous OVP trigger or threshold value is derived directly from the measured output voltage.

According to one or more other embodiments, the instantaneous OVP trigger or threshold value may be derived directly from the measured output voltage. This is shown, schematically, in FIG. 6*b*. As described above, the voltage $V_{SNSOUT}$ is representative of the output voltage. This voltage on pin SNSOUT 610 of the SMPS control IC may be processed in either the analog or the digital domain. Processing in the digital domain is generally preferred, and in order to process it in the digital domain, the signal is first digitised by means of an analog-to-digital converter 620. This is shown dashed in FIG. 6*b* since it is optional. The signal is then subjected to a slew rate limiter 635. The function of this limiter will be familiar to the skilled person and will be described in more detail hereinbelow. As a next stage of processing, at 645, an offset, which in this case is a offset ΔV, which increases over time from 1V to 7V, is added to the slew rate limited signal. The result is a slew rate limited signal with an offset ΔV, and this signal may be used as the time-variable OVP threshold or trigger value, Vtr(t).

One convenient digital implementation of this, would be, at time n:

$$Vtr(t(n)) = \min\left(Vtr(t(n-1)) + M * (t(n) - t(n-1)),\ \text{Voffset\_rel} * Vsnsout + \text{Voffset\_abs}\right),$$

where Vtr(t(n)) is the new OVP level and Vtr(t(n−1)) is the previous defined OVP level at time (t(n−1)), and Vtr(t(n)) is defined as the minimum of the OVP level based on the measured SNSOUT or limited by a slewrate based on the previous defined OVP level.

In order to determine whether a OVP event has occurred, Vtr(t) is compared with the original digitised version of the signal $V_{SNSOUT}$. This is shown by comparator 650 in FIG. 6*b*. If the digitised version of the signal $V_{SNSOUT}$ is greater than Vtr(t), it is likely that an OVP event has occurred. Optional filtering may be included as shown at 665 after the comparator and/or before the comparator as shown at 660, and the result of the (optionally filtered) comparator is an OVP detection signal (OVP_det).

As the skilled person will be aware, a slew rate limiter is a filter which prevents a signal changing rapidly. Typically, a slew rate filter may prevent either a very fast increase or a very fast decrease in the signal. For the present disclosure, it is only the positive slew rate which need be limited. If the input signal rises faster than a maximum allowable slew rate, Msl, the filter acts to limit the increase in the output to this maximum slew rate Msl, such that:

$$\frac{dV_{out}}{dt} \leq Msl$$

For a signal which is changing only slowly, the slew rate limiter has essentially no effect.

Figure 7:
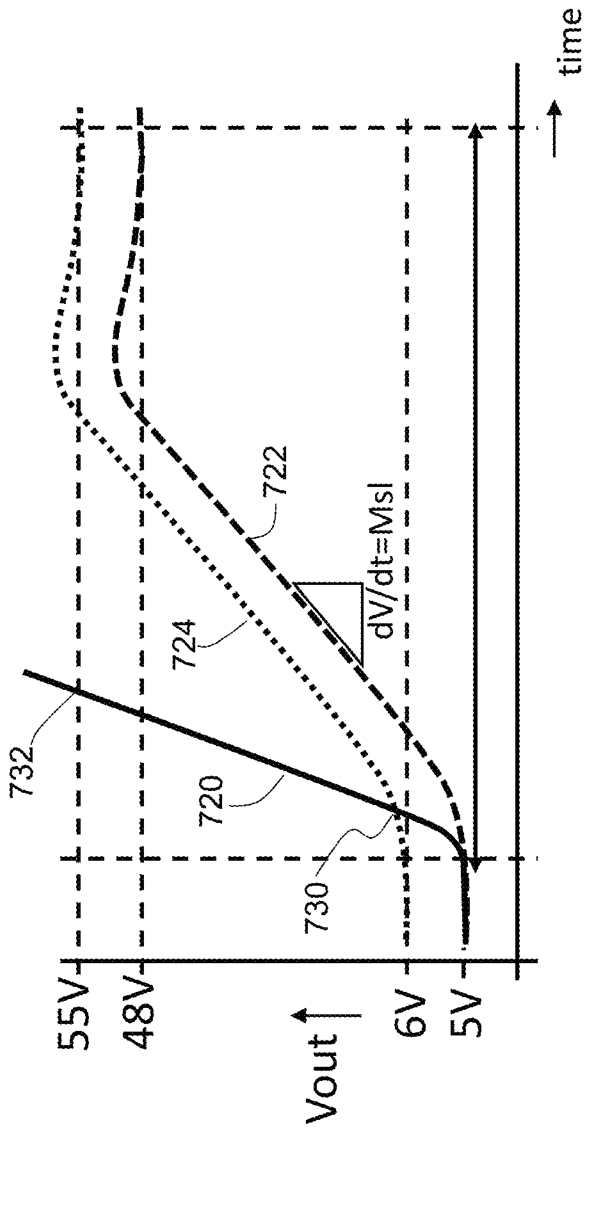
FIG. 7 illustrates the detection of an over-voltage event.

Turning now to FIG. 7, this illustrates the detection of an over-voltage event. In this example, the voltage output by the SMPS increases rapidly, as shown at 720. This may occur for instance where a secondary controller fails, such that a USB-PD control IC requests a transition from a first target voltage to a second, higher, target voltage for example for a high power device which operates at a high voltage, but there is a failure in a second controller, such as a USB-PD control IC, such that the output voltage is effectively unconstrained. For example, if the secondary USB-PD controller fails, the SMPS power supply assumes that it has to increase its output voltage. Due to a failed USB-PD controller, switch 140 (shown in FIG. 1) may be closed and the output voltage (Vout) may be increased to above the allowed voltage of the load. Which can be unsafe or damaging the load. Or there may be even applications without a secondary switch 140 (such as that shown in FIG. 1) in which for instance the optocoupler (shown at 160 in FIG. 1) fails.

At 722 is shown a slew rate limited version of the output voltage of 720. As can be seen, this curve resembles 720 except that the gradient of the increase in voltage is constrained to be no greater than Msl. 724 shows a curve which corresponds to 722 except that a voltage offset ΔV has been added to the slew rate limited value. As shown at 730, there is a moment in time at which the actual output voltage 720 crosses the slew-rate-limited-with-voltage-offset version. By comparing the two signals, as described in FIG. 6, it may be concluded that an OVP event has occurred.

It will be appreciated from FIG. 7 that the over-voltage detection occurs, at 730, much sooner than would be the case in a conventional OVP arrangement in which the over-voltage would only be detected at a much later time as shown at 730. In particular the over-voltage detection occurs at a much lower voltage—in the example shown the over-voltage detection at 730 occurs around 7V, rather than 55V as would be the case for conventional over-voltage detection at 732. This may be beneficial in that, in the event of a failure of a component in for example the USB-PD system, or a short in the optocoupler, the load device is exposed only to a much lower voltage than in the conventional system. By applying suitable protection in the event of an over-voltage detection exposure of the load device to high voltages such as 55V, which may be damaging to the device particularly for a low-voltage device which is designed to be operable at the lower voltage level such as 5V shown.

Figure 8:
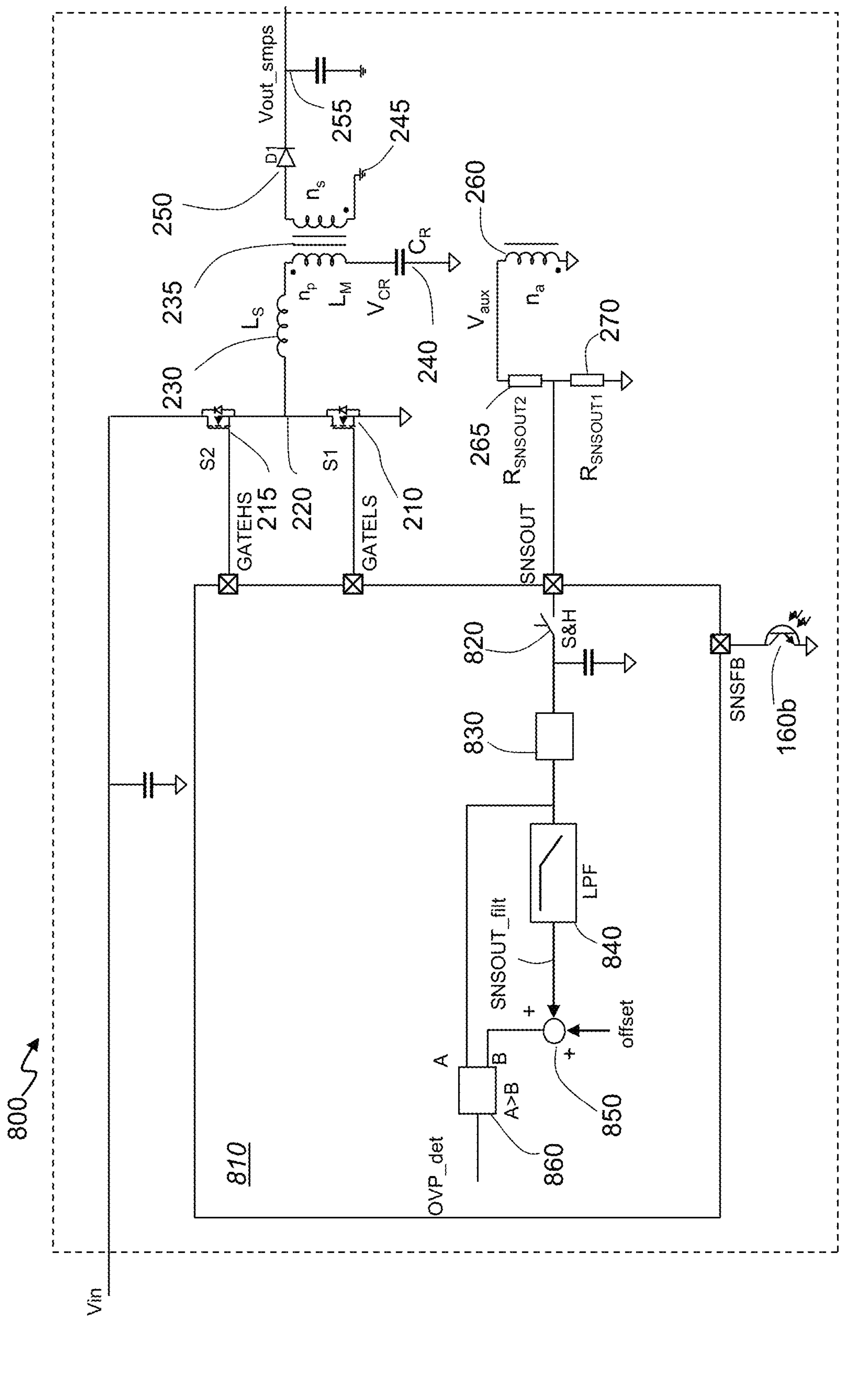
FIG. 8 shows a SMPS, and an SMPS control IC, according to embodiments of the disclosure.

Referring now to FIG. 8, this shows a SMPS 800, and an SMPS control IC 810, according to embodiments of the disclosure. Most of the SMPS is similar to a conventional SMPS, except for the control IC 810, which includes OVP. As shown, the voltage on the pin SNSOUT, which is representative of the output voltage Vout_smps of the SMPS, is captured by a sample-and-hold unit 820 and converted to a digital value by ADC 830. A time-varying signal representative of a maximum allowed output voltage is then generated from this analog value. First of the signal is filtered in a slew rate limiter. As shown, the slew rate limiter could be implemented as a low-pass filter 840, although such a filter introduces a delay. A voltage offset ("offset") is then added to the slew rate limited signal at adder 850. A comparator 860 is used to compare the digitised signal ("A") with the slew rate limited signal including offset ("B)". In the event that the comparator determines the digitised actual signal is greater than the slew rate limited signal including offset, and over-voltage detection indicator (OVP_det) is generated. Appropriate response action may then be taken, such as switching off the SMPS, or disconnecting the load.

From reading the present disclosure, other variations and modifications will be apparent to the skilled person. Such variations and modifications may involve equivalent and other features which are already known in the art of over-voltage protection, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

It is noted that one or more embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Features which are described in the context of separate embodiments may also be provided in combination in a single embodiment. Conversely, various features which are, for brevity, described in the context of a single embodiment, may also be provided separately or in any suitable sub-combination.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

The invention claimed is:

1. A method of detecting an over-voltage on an output of a variable output voltage SMPS, the method comprising, determining a signal representative of an output voltage, wherein the output voltage is an output voltage of the SMPS;

determining a time-varying signal representative of a maximum allowed output voltage;

comparing the signal representative of the output voltage with an instantaneous value of the time-varying signal representative of the maximum allowed output voltage; and in response to the signal representative of the output voltage being greater than the instantaneous value of the time-varying signal representative of the maximum allowed output voltage, indicating an over-voltage.

2. The method of claim 1, wherein the SMPS is in transition from a first target output voltage to a, higher, second target output voltage.

3. The method of claim 1, wherein the signal representative of an output voltage is a digital signal.

4. The method of claim 2, wherein the instantaneous value of the time-varying signal representative of the maximum allowed output voltage is determined from the first target output voltage by adding a time-integral of a maximum slew rate to a first target voltage and adding an offset voltage.

5. The method of claim 2, wherein the instantaneous value of the time-varying signal representative of the maximum allowed output voltage is predetermined.

6. The method of claim 2, wherein the instantaneous value of the time-varying signal representative of the maximum allowed output voltage is predetermined and stored in a look-up table.

7. The method of claim 2, wherein the time-varying signal representative of a maximum allowed output voltage is determined from the signal representative of an output voltage.

8. The method of claim 7, wherein time-varying signal representative of the maximum allowed output voltage is determined from the signal representative of an output voltage by applying a slew-rate-limiting filter to the signal representative of an output voltage, and adding a voltage offset.

9. The method of claim 7, wherein time-varying signal representative of the maximum allowed output voltage is determined from the signal representative of an output voltage by applying a slew-rate-limiting filter to the signal representative of an output voltage, adding a voltage offset, and subsequently applying a low-pass filter.

10. An over-voltage protection, OVP, apparatus for a variable-output voltage switch mode power supply, SMPS, the OVP apparatus comprising a voltage sensor for sensing a signal representative of an instantaneous output voltage of the SMPS;

a calculation unit configured to determine a maximum allowed instantaneous output voltage, wherein the maximum allowed instantaneous output voltage varies with time; and a comparator configured to compare the signal representative of the instantaneous output voltage with the maximum allowed instantaneous output voltage, and to provide an over-voltage indicator in response to the instantaneous output voltage exceeding the maximum allowed instantaneous output voltage.

11. The OVP apparatus as claimed in claim 10, further comprising:

a look-up table configured to store the maximum allowed instantaneous output voltage.

12. The OVP apparatus of as claimed in claim 10, wherein the calculation unit is configured to determine the maximum allowed instantaneous output voltage from the first target voltage by adding an offset voltage to a maximum instantaneous expected voltage.

13. The OVP apparatus of as claimed in claim 12, wherein the offset voltage is a fixed offset.

14. The OVP apparatus of as claimed in claim 12, wherein the offset voltage is a relative offset which varies with the maximum instantaneous expected voltage.

15. The OVP apparatus of as claimed in claim 14, wherein the relative offset is proportional to the maximum instantaneous expected voltage.

16. The OVP apparatus as claimed in claim 12, further comprising:

a slew-rate-limiting filter configured to determine the maximum instantaneous expected voltage from an integral of the signal representative of the instantaneous output voltage.

17. A controller for an SMPS, comprising the OVP apparatus as claimed in claim 12.

18. An SMPS comprising the controller of claim 12, and a transformer having an auxiliary winding on a primary side, wherein the signal representative of the instantaneous output voltage is a scaled version of a voltage across the auxiliary winding.

* * * * *